United States Patent Office 2,840,529
Patented June 24, 1958

2,840,529

ALUMINA CONTAINING CATALYST

Philip A. Lefrancois, Cranford, N. J., assignor to The M. W. Kellogg Company, Jersey City, N. J., a corporation of Delaware No Drawing. Application April 21, 1952
Serial No. 283,517

10 Claims. (Cl. 252—455)

This invention relates to a novel catalytic material and also to a method of preparing the same, and more particularly pertains to a novel catalytic material containing alumina which is especially adapted for catalytic reactions, e. g., hydrocarbon conversion.

An object of this invention is to provide a novel alumina containing catalytic material.

Another object of this invention is to provide a novel method for preparing an alumina containing catalyst.

Still another object of this invention is to provide a novel catalytic material containing alumina which is especially adapted for the catalytic conversion of hydrocarbons.

A further object of this invention is to provide a catalytic material containing alumina which is particularly adapted for the reforming of hydrocarbon oils, e. g., petroleum naphthas.

Other objects and advantages of this invention will become apparent from the following description and explanation thereof.

In accordance with the present invention, a novel catalytic material containing alumina is provided which is prepared by the method comprising the reaction of aluminum, water and an activating agent selected from the group consisting of an element which is situated below aluminum in the Electromotive Series and/or a compound thereof at an elevated temperature sufficient to initiate the reaction, and then combining therewith the catalytic agent selected from the class consisting of an element of groups IB, III, IV, V, VI and VIII in the periodic table and the sulfides and oxides thereof.

The catalytic agent which is employed in combination with the alumina can be one or more of the elements of groups IB, III, IV, V, VI and VIII in the periodic table, or such an element can be used in the form of a sulfide and/or oxide. Specific examples of the catalytic agent are silica; boria; copper; silver; iron; platinum; palladium; tungsten; and/or the oxides and sulfides of chromium, molybdenum, vanadium, iron, cobalt, nickel, tungsten, etc. The amount of catalytic agent present in the catalyst will vary depending upon the particular use for which the catalyst is intended. Generally, however, the catalytic agent comprises about 0.1 to about 40% by weight of the total catalyst. When the catalytic material is intended primarily for a catalytic cracking operation, the catalytic agent is preferably about 60 to 95% by weight of the total catalyst. With respect to a reforming operation, it is preferred that the catalytic agent constitutes about 0.1 to about 30% by weight of the total catalyst. Particularly effective types of cracking catalysts include, for example, silica-alumina, boria-alumina, silica-magnesia, etc. In this regard, preferred catalysts for hydroforming operations include, for example, the oxides and/or sulfides of the left hand elements of group VI, e. g., molybdenum and chromium, as well as platinum and/or palladium on alumina. For the purpose of improving the stability of the catalysts at elevated temperatures, it is contemplated using small amounts of silica in combination with the alumina and the catalytic agent described above. For this purpose the silica is employed in amounts of about 0.5 to about 15% by weight of the catalyst. In addition to the effect of improving the heat stability of the catalyst by means of silica, it is also desirable to add silica to the platinum and/or palladium catalyst in small amounts for the purpose of inhibiting undesirable cracking effects. Such undesirable effects can be inhibited by the use of about 0.05 to about 15% by weight of silica, preferably about .5 to about 10% by weight based on the total catalyst.

Under certain conditions, it is desirable to incorporate into the final catalyst an additional carrier material. In this respect, the alumina prepared in accordance with the present invention can be used in combination with kieselguhr, pumice, fuller's earth, bentonite clays, "Superfiltrol," etc. Whenever an additional carrier material is employed in the catalyst, it is desirable to use about 2 to about 50% by weight, preferably about 5 to about 25% by weight of the same, based on the total catalyst. This auxiliary carrier material may serve to lessen the instability of the alumina at elevated temperatures and also to enhance its catalytic properties with respect to certain specific uses, such as for example, in the case of catalytic cracking, hydroforming, hydrogenation, dehydrogenation, etc.

The alumina is prepared by reacting aluminum metal, water and an activating agent at an elevated temperature which is sufficient to initiate the reaction. The aluminum in the metallic state is useful in any physical form for the intended reaction, for example, the aluminum metal can be furnished in the form of metal strips, sheets, pellets, lumps, turnings, in powdered or finely divided form, etc. Aluminum in the metallic state, if exposed to the atmosphere for an appreciable period of time will become oxidized and form an aluminum oxide coating on the surface thereof. For the purposes of this invention, it is preferred that the aluminum metal be substantially free of the oxide coating in order that the reaction may proceed at a reasonable rate. The amount of aluminum which is employed in the reaction is determined on the basis of the water which is present during the reaction. Generally, to prepare the alumina about 0.1 to about 1.5 pounds of aluminum per pound of water, preferably about 0.3 to 1.0 pound of aluminum per pound of water are employed.

The activating agent which is used in the preparation of the alumina serves to activate the reaction between the aluminum metal and water. As previously indicated, the activating agent can be any metal which is below aluminum in the electromotive series and/or any compound of such a metal which will serve to activate the reaction. The activating agent appears to create an electromotive potential with the aluminum metal, and in this manner, the reaction between the aluminum and the water is facilitated. As long as the activating agent contains a metal which is below aluminum in the electromotive series, the electromotive potential is created with the aluminum. However, in this respect, it is preferred to employ an activating agent which will create with the aluminum an electromotive potential of at least about 0.2 volt in order to avoid or substantially overcome any tendency for polarizing effects to occur. The polarizing effects which might occur are due to the presence of hydrogen on the surface of the reacting materials. Generally, the activating agent is employed in an amount of about 0.0005 to about 0.1 pound per pound of aluminum, preferably about 0.002 to about 0.01 pound per pound of aluminum.

The activating agent of this invention includes, for example, silver, zinc, platinum, iridium, mercury, cadmium ruthenium, rhodium, etc., more particularly, those metals of groups I, II and VIII in the periodic table which are lower than aluminum in the electromotive series and/or the compounds thereof. In the form of a compound, the activating agent can be either an organic or inorganic compound of the metal. In the form of a compound, the activating agent can be used, for example, as an oxide, halide (fluoride, chloride, bromide and iodide), nitrate, sulfate, carbonate, nitrite, sulfite, phosphate, oxy-halide, hydroxides, formates, acetates, propionates, alkyl or aryl or mixed metallo compounds, basic carbonates, chromates, cyanides, oxalates, silicofluorides, etc. Specific examples of compounds which can be used as activating agents are mercuric oxide, mercuric acetate, mercurous chloride, silver nitrate, rhodium chloride, etc.

In order to initiate the reaction between aluminum and water in the presence of an activating agent, an elevated temperature is employed. Generally, a temperature of at least about 150° F. or more usually, in the range of about 175° to about 300° F. is satisfactory to commence the reaction. Normally, the reaction will proceed satisfactorily at atmospheric pressure. However, in some instances, it may be desirable to conduct the reaction at a super-atmospheric pressure in order to enable higher temperatures to be used. When the reaction is conducted at higher temperatures, it is to be expected that the rate of reaction is faster and, therefore, less time may be required in the preparation of the alumina. For this purpose, a pressure in the order of about 25 to about 500 p. s. i. g., will be satisfactory for the purpose of effecting a faster rate of reaction between the aluminum and water.

The alumina which has been prepared by reacting aluminum and water in the presence of the activating agent may be used without further treatment for preparing the finished catalyst. Normally, the alumina slurry thus produced has a pH in the range of about 7.5 to about 9.5. It was observed that the alumina does not undergo a change to a gel form even with an alkaline treatment to raise the pH above the level at which it is normally found as a result of the initial stage of preparation. It was also found, however, that treatment of the alumina with an alkaline reagent, and then aging the same for a suitable period of time, will produce a catalyst which is more active than those catalysts derived from an alumina without treatment by means of an alkaline reagent. For the purposes of this invention, it is intended to include treating the alumina with an alkaline reagent in order to raise the pH to at least about 8.5 with or without aging for a suitable period of time, e. g., at least about 10 hours. The alkaline reagent used for this purpose includes, for example, bases, salts of strong bases and weak acids, and basic quaternary ammonium compounds. The alkaline reagent can include the alkali and the alkaline earth metals and the oxides and hydroxides as well as the salts containing the alkali and alkaline earth metals, and which have been formed with weak acids. Another suitable class of an alkaline reagent includes, for example, ammonia and substituted ammonium compounds. Specific examples of alkaline reagents are ammonium hydroxide, tetramethyl ammonium hydroxide, sodium hydroxide, potassium hydroxide, isoamylamine, butyl amines, diethylamine, piperidine, etc. Generally, in treating the alumina with an alkaline reagent, it is preferred to employ ammonium hydroxide because this reagent does not leave any residue in the catalyst which would tend to cause any undesirable effects. The quantity of alkaline reagent which is preferred for the purpose of treating the alumina, will depend upon the pH adjustment required. In one aspect of the invention, it is intended to adjust the pH of the alumina to at least about 8.5 and then aging the treated alumina for a period of at least about 10 hours. The alumina prepared in accordance with this invention tends to yield readily upon calcination the eta form of alumina. It has been observed that by treating the alumina with an alkaline reagent with or without a suitable aging period, the amount of eta-alumina is increased over the amount which is usually present in the alumina derived without the pH adjustment.

Various techniques can be used for preparing the catalytic material. In one instance, the alumina as a slurry or in the dried and/or calcined form is combined with a catalytic agent in the form of a suitable compound which upon calcination will produce the desired catalytic state. In the case of preparing a catalyst containing molybdenum oxide, the alumina can be mixed with ammonium molybdate as an aqueous solution, molybdenum trioxide in the solid form, or the alkali metal salt of molybdic acid, etc., and then dried with subsequent calcination. One specific procedure involves mixing the aqueous solution of catalytic agent in suitable form with either a slurry of alumina, dried alumina or calcined alumina, followed by a drying step and then calcination. Another method of preparing molybdena catalyst is to mix the alumina slurry, the dried alumina or the calcined alumina with molybdenum trioxide in the solid form followed by a drying step, if necessary, and then calcination at an elevated temperature in the order of about 700° to about 1500° F. The preparation of platinum catalysts involves combining a slurry of alumina, the dried alumina or calcined alumina with a compound of platinum, such as for example, platinum sulfide, platinum ammine complex, ammonium and alkali metal salts of chloroplatinic acid, etc. After combining the desired components, the mixture is dried, if necessary, and then calcined at an elevated temperature. For another preparation of catalyst, it is desirable to use the catalytic agent in a form which will readily disperse or distribute throughout the carrier material in order to obtain catalysts of high activity. The precursor state of the catalytic agent is well known to those skilled in the art and, therefore, it should be understood that such forms of catalytic agent can be used in the present invention for the preparation of the finished catalyst.

As previously indicated, it is contemplated employing small amounts of silica along with the alumina in the catalytic material. The silica can be added in the form of silicon tetrachloride, an alkyl ester of orthosilicic acid, e. g., ethyl ortho-silicate, methyl ortho-silicate, propyl ortho-silicate, cracking catalyst hydrogel (silica-alumina, silica-magnesia), fluorosilicic acid, magnesium fluorosilicate, etc. The silica forming substance can be added directly to the slurry of alumina, the dried alumina or the calcined alumina, prior to mixing with the precursor material of the catalytic agent. Alternatively, the silica-forming substance can be added to the mixture of catalytic agent and alumina containing substance, prior to the drying and/or calcination treatments. In some instances, it may be desirable to prepare the calcined catalyst containing alumina and the catalytic agent and then mixing the same with a solid or gel of silica followed by a drying operation and then calcination at an elevated temperature. In addition, the siliceous material may be added at the start of the aluminum, water, activating agent reaction.

The catalyst mass was dried at a temperature not greater than about 400° F., or more usually, at a temperature in the order of about 200° to about 250° F. At temperatures in the range given, drying is conducted for a period of up to about 60 hours, or more usually, for a period of 15 to about 50 hours. The drying operation is followed by a calcination treatment which is effected at an elevated temperature of at least about 700° F. and up to about 1450° F., more usually, the calcination treatment is accomplished at a temperature in the range of about 1000° to about 1250° F. Calcination is effected by using relatively short periods of time, generally about 2 to about 9 hours. More usually, the calcination of the catalyst is conducted for a period of about 3 to about 6 hours. At calcination temperature, if the catalytic agent is employed in a precursor state for the purpose of being distributed uniformly throughout the catalyst mass and is not catalytically active, the precursor material is converted to the active catalytic form. In this manner, the catalytic agent is distributed uniformly on the carrier material and is then converted to the active state at calcination in substantially the same positions on the carrier as it was present in the precursor state.

Among the numerous reactions which lend themselves to catalysis in the presence of contact materials of the type disclosed herein are dehydrogenation, hydrogenation, hydrogenolysis, isomerization, oxidation, aromatization, cyclization, hydrodesulfurization, hydrocarbon synthesis, dealkylation, dehydroxylation, alkylation, polymerization and hydrogen exchange systems. In general, these reactions may be carried out under the conventional reaction conditions of temperature, pressure, etc., with the catalysts described herein. However, in many instances, the activity of the new contact materials permits the employment of less severe conditions, especially lower temperatures and contact times, without any sacrifice in selectivity. A wide variety of organic compounds may be dehydrogenated including naphthenes, paraffins, alkyl radicals in aralkyl compounds, butenes, sterols, glycerides and many other organic compounds. By changing the reaction conditions in known manner, these catalysts are also effective for hydrogenation of organic compounds in general, and especially fatty glycerides and olefins. They may also be employed in the hydrogenolysis of nitrobenzene to aniline and similar chemical changes. The dehydroxylation or demethylation, or both, of cresylic acid-type compounds may also be carried out in the presence of such contact materials. Among the substances which can be isomerized with these catalysts, paraffins and naphthenes are the most significant feeds from a commercial standpoint; but polyalkyl aromatics may be similarly treated, as exemplified in the catalytic transformation of o-xylene to p-xylene. The contact materials of the present invention are especially suitable for cracking in the presence of hydrogen as in the hydroforming process in which the feed is customarily a low octane naphtha. In hydroforming by the present catalytic process a substantial degree of sulfur removal occurs and the reaction may readily be shifted to favor hydrodesulfurization rather than reforming by changing the reaction conditions in a manner familiar to those skilled in the art. The synthesis of hydrocarbons from carbon monoxide and hydrogen in the presence of the new contact materials is also contemplated. In the field of oxidative reactions, numerous changes can be effected with the present catalysts including, inter alia, the transformation of sulfur dioxide to sulfur trioxide, the formation of nitric acid and also hydrazine from ammonia, the conversion of urea into hydrazine and the oxidation of hydrocarbons in general. The contact materials employed in the present invention are also suitable for hydrogen exchange systems as exemplified by the hydrogenation of coal with decalin and tetralin. By reason of their aromatizing and cyclizing characteristics they are outstanding in preparing benzene, toluene and the like in substantial yields from paraffins and naphthenes and also for the production of more highly cyclized compounds such as naphthalene, anthracene and alkyl-substituted derivatives thereof under suitable conditions. In addition, polymerization and alkylation reactions are responsive to these catalysts; for example, the polymerization of olefins and the alkylation of aromatic compounds.

The catalysts of the present invention are particularly adapted for reforming naphtha stocks. In reforming naphtha or gasoline stocks with the catalyst disclosed herein, the conditions may be varied rather widely; thus temperatures of about 600° to about 1050° F. are suitable and the preferred range is from about 900° to about 950° F. Within these temperature limits, weight space velocities of about 0.05 to about 10.0 pounds of naphtha per hour per pound of catalyst in the reaction zone may be employed advantageously; however, space velocities of about 0.25 to about 5.0 provide the best results. Hydrogen should be introduced into the reforming reactor at rates running from about 0.5 to about 20.0 mols of hydrogen per mol of hydrocarbon reactants. This hydrogen may be in admixture with light gaseous hydrocarbons. In fact, it is usually introduced by recycling the normally gaseous products, chiefly hydrogen along with about 10% more or less of hydrocarbons containing 1–3 carbon atoms of the reforming reaction. The hydrogen serves an important function in maintaining the activity of the contact material by minimizing coke deposition thereon. While the total reaction pressure may be minimized at any value between about 50 and 1000 pounds per square inch gauge (p. s. i. g.), the best results are obtained by holding the reaction pressure within the range of between about 100 and about 750 p. s. i. g. The conditions can be varied to include operations wherein there is a net consumption of hydrogen as well as a net production of hydrogen as in "hydro-forming."

The catalysts of this invention can be employed in processes involving a static or a fluid bed of catalyst, and the systems can involve a fixed bed or a circulating bed. In any case, the catalyst can be in lump, granular or finely divided form. Granular catalyst may have a particle size of about 0.1 to 10 mm., average diameter; whereas the powdered or finely divided catalyst may have a particle size of about 5 to about 250 microns, or more usually, about 10 to about 100 microns. In a moving bed system, generally a catalyst to oil ratio, on a weight basis, of about 0.05 to about 20, or more usually, about 0.1 to about 10, preferably about 0.5 to 2.5 is employed.

In order to more fully understand the present invention reference will be had to examples of catalyst preparations, however, it should be understood that no undue limitations or restrictions should be imposed by reason thereof.

CATALYST I

The alumina slurry was prepared by reacting 12,819 grams of aluminum pellets, 18 liters of distilled water and 65 grams of mercuric oxide. In order to initiate the reaction, the reaction mixture was heated with steam for 6 minutes until boiling occurred. After reacting the mixture for a period of 1½ hours, it was poured through a cheesecloth in order to remove any unreacted and/or solid materials contained therein. The filtered alumina slurry weighed 15,635 grams at 155° F. It possessed a density of 1.062 grams per cc. at 150° F. and a pH of 7.83 at 29.5° C., and ignition loss showed 8.64% solids, thus indicating that 1350 grams of $Al_2O_3$ were produced.

6850 grams of alumina slurry (600 grams of $Al_2O_3$) were poured into a tray and dried in a Grieve-Hendry oven at 240° F. for a period of 19¼ hours. Since the alumina was not completely dry, it was placed in a Despatch oven and dried at 240° F. for an additional 2¾ hours. The dried alumina was ground to a powdered form and then calcined for 3 hours at 1200° F. The calcined alumina weighed 594 grams before being impregnated with a solution of 72.0 grams of ammonium molybdate $((NH_4)_6Mo_7O_{24} \cdot 4H_2O)$ dissolved in 500 cc. of distilled water. An additional 210 cc. of water were added in order to completely wet the alumina.

The impregnated alumina was dried in the Grieve-Hendry oven at 240° F. for 18 hours, and thereafter, calcined for 3 hours at 1200° F. The finished catalyst contained 90.83% alumina and 8.97% $MoO_3$, based on the total catalyst.

In the example of catalyst preparation given below, the alumina was dried by a spray drying technique, otherwise the procedure is substantially the same as given above under Catalyst I.

CATALYST II 8553 grams of alumina slurry prepared in accordance with the method described in Catalyst I were spray dried in a Niro unit using the following conditions: an inlet temperature of 400° C., an outlet temperature of 115° C. and a feed rate of 85 cc. per minute. The Nitro laboratory spray dryer consists of a direct fired gas heated chamber in which the material to be dried is fed into a centrifugal atomizer revolving at about 50,000 R. P. M. The dried powder is pneumatically conveyed to a cyclone separator where the dried powder is collected. The spray dried alumina weighed 1005 grams and by ignition loss 68.09% solids were produced thus indicating the presence of 685 grams of $Al_2O_3$. The spray dried alumina powder was calcined for 3 hours at 1200° F. in a Hoskins furnace. The alumina thus calcined was then impregnated with a solution containing 68.3 grams of ammonium molybdate $((NH_4)_6Mo_7O_{24} \cdot 4H_2O)$ dissolved in 500 cc. of distilled water. An additional 450 cc. of water were added in order to completely wet the alumina. The impregnated alumina was dried in an Elconap oven at 240° F. for a period of 17⅓ hours. Thereafter, the dried catalyst was calcined for 3 hours at 1200° F. The finished catalyst contained 88.76% $Al_2O_3$ and 9.00% $MoO_3$ and a trace of $Fe_2O_3$.

CATALYST III

In order to evaluate the stability of Catalyst II it was calcined for a 6 hour period at 1470° F.

In the example given below, the pH of the alumina slurry was raised in order to determine the effect, if any, on catalyst activity.

CATALYST IV

The alumina slurry was prepared by reacting 12,819 grams of aluminum pellets, 18 liters of water and 65 grams of mercuric oxide. The reaction was initiated by introducing steam into the reaction mass while stirring the same. After injecting steam for a 3 minute period the mass seemed to be boiling, hence, the injection of steam was discontinued. The reaction was allowed to proceed for 1¼ hours and then the mass was filtered through cheesecloth in order to remove any unreacted materials and/or solid material. The filtered alumina slurry weighed 15,387 grams, it had a density of 1.069 grams per cc. at 148° F. and a pH of 8.46 at 32.5° C.

The pH of the alumina slurry was adjusted to 10.20 at 28° C. by the addition of 50 cc. of concentrated ammonium hydroxide (28–30% ammonia). The treated alumina was permitted to age for a period of 17 hours while being stirred slowly. The aged alumina slurry had a pH of 10.00 at 22.5° C. The aged alumina weighed 14,548 grams.

Approximately 7274 grams of the aged alumina were spray dried in a Niro unit using the following conditions: an inlet temperature of 400° C., an outlet temperature of 115° C. and a feed rate of 82.5 cc. per minute. As a result of spray drying 809 grams of alumina powder were produced. The spray dried alumina was then calcined for 3 hours at 1200° F. The calcined alumina weighing 550 grams was impregnated with a solution containing 67.1 grams of ammonium molybdate $$((NH_4)_6Mo_7O_{24} \cdot 4H_2O)$$

dissolved in 750 cc. of distilled water. An additional 170 cc. of water were added in order to completely wet the alumina. The impregnated catalyst was then dried in an Elconap oven at 240° F. for 16 hours. The dried catalyst was then calcined for 3 hours at 1200° F. The catalyst contained 8.73% $MoO_3$ and the remainder being approximately all alumina.

In the following example, the catalyst was prepared in essentially the same manner as given above under Catalyst IV, except that it was dried in an oven rather than by the spray drying technique.

CATALYST V 7274 grams of the aged sol prepared in the manner described above under Catalyst IV were dried in a Grieve-Hendry oven for a period of 24½ hours at 240° F. The dried alumina was then ground into a powdered form and weighed 928 grams. The powdered alumina was calcined for 3 hours at 1200° F. The calcined alumina weighing 662 grams was impregnated with a solution containing 79.3 grams of ammonium molybdate $$((NH_4)_6Mo_7O_{24} \cdot 4H_2O)$$

dissolved in 500 cc. of water. An additional 410 cc. of water were added in order to completely wet the alumina. Thereafter, the impregnated alumina was dried for 21¼ hours at 240° F. in a Grieve-Hendry oven. The dried catalyst was then calcined for 3 hours at 1200° F. The finished catalyst containing 90.72% alumina and 9.01% $MoO_3$.

In the example given below, the catalyst was prepared by mixing alumina sol directly with the ammonium molybdate solution rather than by the impregnation of the calcined alumina with the activating agent.

CATALYST VI

The alumina slurry was prepared by reacting 12,820 grams of aluminum pellets, 18 liters of water, and 65 grams of mercuric oxide. The reaction was initiated by introducing steam for five minutes into the reaction mass while stirring the same. The reaction was allowed to proceed for 1¼ hours and then the liquid mass was filtered through cheesecloth. The filtered alumina slurry, weighing 15,595 grams, had a pH of 8.90, a density of 1.066 grams per cc. at 40° C., and contained 1211 grams of alumina.

Part of the alumina slurry, weighing 7729 grams and containing 605 grams of alumina, was activated with a solution containing 73.2 grams of ammonium molybdate $((NH_4)_6Mo_7O_{24} \cdot 4H_2O)$, dissolved in 350 cc. of distilled water. The activated alumina slurry after ¼ hour of agitation gave a pH of 7.41 at 27.5° C.

The activated slurry was spray dried in the Niro unit at an inlet temperature of 400° C., an outlet temperature of 125° C. and a feed rate of 90 cc. per minute. The spray dried powder, weighing 940 grams, was calcined for 3 hours at 1200° F. The calcined powder weighed 632 grams. The catalyst contained 8.84% $MoO_3$ and the remainder being substantially all $Al_2O_3$.

The example below illustrates a catalyst preparation of dry mixing of the activating agent with the alumina.

CATALYST VIII

The alumina slurry was prepared by reacting 12,616 grams of aluminum pellets, 18 liters of water, and 65 grams of mercuric oxide. The reaction was started by introducing steam for four minutes into the reaction mass while stirring the same. The reaction was allowed to proceed for 1½ hours and then the liquid mass was filtered through cheesecloth. The filtered alumina slurry, weighing 11,746 grams, had an alumina content of 16.32 weight percent, a pH of 9.00 at 28° C. and contained 1920 grams of alumina. One-half of the alumina slurry was spray dried in the Niro spray dryer at an inlet temperature of 410° C., an outlet temperature of 120° C., and a rate of 80 cc. per minute. The spray dried powder contained 66.5 weight percent alumina. A portion of the spray dried alumina, weighing 902 grams and containing 600 grams of alumina, was dry mixed with 60.7 grams of molybdenum trioxide, 99% pure. The mixed powders were then calcined for 3 hours at 1200° F. and the product weighed 633 grams. The finished catalyst contained 9.21% $MoO_3$ and the remainder being substantially all $Al_2O_3$.

The following series of examples involve the use of silica in the catalyst preparation in order to improve the stability at elevated temperatures.

CATALYST IX

The alumina was prepared by reacting 12,820 grams of aluminum pellets, 18 liters of distilled water and 65 grams of mercuric oxide. The reaction was initiated by introducing live steam into the reaction mixture for a period of 5 minutes. The reaction was allowed to proceed with continuous agitation for a period of 1¼ hours. At the end of the reaction period, the reaction mixture was filtered through a cheesecloth. The filtered alumina slurry contained 15,595 grams containing 7.77% solids by ignition loss, a density of 1.066 grams per cc. at 40° C. and a pH of 8.90 at 29.5° C.

The alumina slurry weighing 7729 grams was stirred for a 5 minute period before the addition of 60.5 cc. of silicon tetrachloride (32 grams of $SiO_2$). The silicon tetrachloride was added below the surface of the slurry while stirring vigorously. After a 15 minute period, the pH was 1.35 at 33° C.

In an effort to raise the pH of the slurry, 100 cc. of ammonium hydroxide (28–30% ammonia) were added to the alumina. After agitating the alumina for a period of 10 minutes, the pH was 3.67 at 31° C. An additional 28 cc. of concentrated ammonium hydroxide was added to the alumina. After a 25 minute period, the alumina has a pH of 6.08 at 28° C. Thereafter, the alumina was spray dried in a Niro unit using the following conditions: an inlet temperature of 400° C., an outlet temperature of 118° C. and a feed rate of 90 cc. per minute. The spray dried alumina weighed 970 grams. It was then calcined for a 3 hour period at 1200° F. The calcined alumina weighed 602 grams.

The calcined alumina was impregnated with a solution containing 73.1 grams of ammonium molybdate $$((NH_4)_6Mo_7O_{24} \cdot 4H_2O)$$

dissolved in 500 cc. of distilled water. An additional 350 cc. of water were added in order to completely wet the alumina. The impregnated alumina was first dried in a Grieve-Hendry oven for 18¼ hours at 240° F. and then calcined for a 3 hour period at 1200° F. The finished catalyst contained 8.89% $MoO_3$, 4.60% $SiO_2$ and the remainder being approximately all alumina.

In the following experiment, a different silica forming substance was employed in the preparation of the catalyst.

CATALYST X

The alumina slurry was prepared by reacting 12,507 grams of aluminum pellets, 18 liters of distilled water and 65 grams of mercuric oxide. The reaction was initiated by the addition of live steam for a period of 4 minutes while continuously agitating. The reaction was allowed to proceed for 1¼ hours with continuous mixing. The reaction mixture was then filtered through a cheesecloth and the filtered alumina slurry weighed 15,604 grams having a pH of 8.13 at 31° C., a density of 1.067 grams per cc. at 50° C. and 8.38% solids determined by ignition loss.

7802 grams of alumina slurry were agitated while adding 132.0 grams of ethyl orthosilicate diluted with 100 cc. of absolute methyl alcohol. The mixture contained a pH of 8.28 at 33° C. Thereafter, the alumina was mixed with a solution containing 83.4 grams of ammonium molybdate 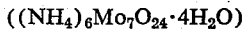 dissolved in 600 cc. of distilled water. After stirring for a 15 minute period, the pH of the catalyst mixture was 6.72 at 31° C.

The catalyst mixture was spray dried in a Niro unit using the following conditions: an inlet temperature of 410° C. an outlet temperature of 117° C. and a feed rate of 100 cc. per minute. The spray dried catalyst was then calcined for a 3 hour period at 1200° F. The finished catalyst contained 8.86% $MoO_3$, 5.01% $SiO_2$ and the remainder being approximately all $Al_2O_3$.

CATALYST XI

Catalyst X above was calcined at 1470° F. for a period of 6 hours.

In the following example, the effect of lowering the pH of the alumina sol is illustrated.

CATALYST XII 7802 grams of the alumina slurry prepared in accordance with the method described under Catalyst X were mixed with 30 cc. of glacial acetic acid diluted with an equal volume of water. After stirring for a 10 minute period, the alumina contained a pH of 4.99 at 31.5° C. Thereafter, the alumina was mixed with a solution containing 132.0 grams of ethyl orthosilicate diluted with 100 cc. of absolute methyl alcohol. The pH of the mixture was 5.01 at 31.5° C.

After stirring the mixture for a 15 minute period, a solution containing 83.4 grams of ammonium molybdate $((NH_4)_6Mo_7O_{24} \cdot 4H_2O)$ dissolved in 600 cc. of distilled water was added. The catalyst solution then had a pH of 5.95 at 29.5° C. The catalyst solution was agitated for a 1 hour period before being spray dried in a Niro unit employing the following conditions: an inlet temperature of 420° C., an outlet temperature of 113° C. and a feed rate of 100 cc. per minute. The spray dried catalyst powder was then calcined for 3 hours at 1200° F. The finished catalyst contained 8.90% $MoO_3$, 4.93% $SiO_2$ and the remainder being approximately all $Al_2O_3$.

CATALYST XIII

Catalyst XII was calcined for a 6 hour period at 1470° F.

For the following example, a hydrogel of silica alumina cracking catalyst was employed for the purpose of supplying silica to the desired catalyst.

CATALYST XIV

The alumina slurry was prepared by reacting 12,515 grams of aluminum pellets, 18 liters of water, and 65 grams of mercuric oxide. The reaction was initiated by the addition of live steam for a period of 5 minutes while agitating continuously. The reaction proceeded for 1¼ hours with continuous mixing. The reaction mixture was then filtered through a cheesecloth and the filtered alumina slurry, weighing 15,311 grams, had a pH of 8.88 at 29° C., a density of 1.090 grams per cc. at 42° C. and 10.03% solids determined by ignition loss.

A silica-alumina cracking catalyst hydrogel was prepared in the following conventional manner. A dilute solution of sodium silicate was reacted with 26% sulfuric acid. The silica gel had a pH of 2.60 at 26.5° C. The addition of aqueous ammonia raised the pH to 6.52 at 285° C. A solution of aluminum sulfate was then added which lowered the pH to 3.09 at 28° C. and required the addition of aqueous ammonia to again raise the pH to 6.56 at 28° C. The silica-alumina hydrogel was filtered and washed repeatedly with acidulated water until the hydrogel was free of sodium and sulfate. The washed hydrogel analyzed 7.19% silica and 1.27% alumina, the remainder being water.

7655 grams of alumina slurry containing 767 grams of alumina was vigorously stirred while adding 552 grams of the above prepared silica-alumina hydrogel slurried in 250 cc. of water. Stirring was continued for 20 minutes and the pH was 8.52 at 27° C. Activation was performed by the addition of a solution of 99.2 grams of ammonium molybdate $((NH_4)_6Mo_7O_{24} \cdot 4H_2O)$ dissolved in 600 cc. of water. After 15 minutes of stirring the pH was 7.50 at 27.5° C. Thereafter, the catalyst mixture was spray dried in the Niro unit at an inlet temperature of 400° C., an outlet temperature of 118° C. and a feed rate of 116 cc. per minute. The spray dried catalyst was then calcined for 3 hours at 1200° F. The finished catalyst contained 8.90% $MoO_3$, 5.04% $SiO_2$ and the remainder being approximately all $Al_2O_3$.

CATALYST XV

Catalyst XIV was calcined for a 6 hour period at 1470° F.

In the following example, the catalyst was prepared essentially the same as above under Catalyst XIV, except that the pH of the alumina sol was lowered.

CATALYST XVI 7655 grams of the alumina slurry prepared in accordance with the method described under Catalyst XIV were mixed with 47 cc. of glacial acetic acid diluted to 94 cc. with distilled water in order to obtain a pH of 5.00 at 26.5° C. while stirring continuously for 50 minutes. The 5 pH alumina slurry was vigorously stirred while adding 552 grams of the silica-alumina hydrogel prepared as described in Catalyst XV and slurried in 250 cc. of water. After stirring 15 minutes a solution of 99.2 grams of ammonium molybdate $((NH_4)_6Mo_7O_{24} \cdot 4H_2O)$ dissolved in 600 cc. of water was added to the alumina slurry. After 15 minutes of agitation, the activated slurry had a pH of 5.34 at 26° C. Thereafter, the catalyst mixture was spray dried in the Niro unit at an inlet temperature of 410° C., an outlet temperature of 117° C., and a feed rate of 116 cc. per minute. The spray dried catalyst was then calcined for 3 hours at 1200° F. The finished catalyst contained 8.99% $MoO_3$, 4.95% $SiO_2$ and the remainder being approximately all $Al_2O_3$.

CATALYST XVII

Catalyst XVI was calcined at 1470° F. for a period of 6 hours.

In the following example, the catalyst was prepared by decreasing the pH and aging the alumina sol.

CATALYST XVIII

The alumina slurry was prepared by reacting 12,500 grams of aluminum pellets, 18 liters of distilled water and 65 grams of mercuric oxide. The reaction was initiated by adding live steam to the mixture for a period of 7 minutes with continuous agitation thereof. The reaction was allowed to proceed with stirring for a period of 1¼ hours. The reaction mixture was filtered through a cheesecloth and the filtered slurry weighed 17,335 grams. The slurry had a pH of 8.82 at 26° C., a density of 1.044 grams per cc. at 49° C. and contained 6.58% solids by ignition loss.

8667.5 grams of alumina slurry were mixed with 30 cc. of glacial acetic acid diluted with an equal volume of water. The pH of the alumina was 4.55 at 32° C. The alumina was allowed to age for a period of 17½ hours. After aging the alumina, a solution containing 115 grams of ethyl orthosilicate diluted with 100 cc. of technical methyl alcohol was added. After stirring the mixture for 25 minutes, the pH was 5.22 at 21° C. Thereafter, a solution containing 73.6 grams of ammonium molybdate $((NH_4)_6Mo_7O_{24} \cdot 4H_2O)$ dissolved in 500 cc. of water were added to the alumina slurry. After stirring for a 15 minute period the pH was 5.43 at 22° C.

The catalyst mixture was spray dried in a Niro unit having an inlet temperature of 380° C., an outlet temperature of 114° C., and a feed rate of 71 cc. per minute. The spray dried catalyst powder was then calcined for a 3 hour period at 1200° F. The finished catalyst contained 8.84% $MoO_3$, 4.95% $SiO_2$ and the remainder being approximately all alumina.

CATALYST XIX

Catalyst XVIII was calcined at 1470° F. for a period of 6 hours.

In the following example, a smaller amount of silica was incorporated into the preparation.

CATALYST XX

The alumina slurry was prepared by reacting 12,600 grams of aluminum pellets, 18 liters of water, and 65 grams of mercuric oxide. The reaction was initiated by the addition of live steam for a period of 4 minutes while agitating continuously. The reaction was allowed to proceed for 1½ hours with continuous mixing. The liquid mass was filtered through a cheesecloth and the filtered alumina slurry, weighing 13,859 grams, had a pH of 9.10 at 26° C., a density of 1.125 grams per cc. at 55.5° C., and 14.43% solids determined by ignition loss.

One half of the alumina slurry containing 927 grams of alumina was vigorously stirred while adding 266 grams of silica-alumina hydrogel prepared as described in Catalyst XIV and slurried in 250 cc. of water. The pH of the alumina-silica slurry after stirring 15 minutes was 8.80 at 27.5° C. The alumina-silica mass was then activated with a solution of 119.5 grams of ammonium molybdate $((NH_4)_6Mo_7O_{24} \cdot 4H_2O)$ dissolved in 600 cc. of water. After 15 minutes of stirring, the acivated slurry had a pH of 6.85 at 29° C. Thereafter, the catalyst mixture was spray dried in the Niro unit at an inlet temperature of 410° C., an outlet temperature of 117° C., and a feed rate of 110 cc. per minute. The spray dried catalyst was then calcined for 3 hours at 1200° F. The finished catalyst contained 8.82% $MoO_3$, 1.92% $SiO_2$ and the remainder being approximately all $Al_2O_3$.

The relative effectiveness of the various catalysts above was determined by using the same in a laboratory hydroforming test unit. In these tests, a Mid-Continent naphtha having an initial boiling point of 230° F. and an end point of 430° F. was used. This naphtha had an octane number (CFRM) of 30 and contained approximately 9% aromatics by volume. The reactor of the test unit had 550 cc. capacity. The catalysts in suitable quantities were charged to the reactor. Hydrogen was fed in a pure state at the rate indicated (S.C.F.B.) as standard cubic feet per barrel of oil feed, the volume of gas being measured at 60° F. and 760 mm. mercury. The regeneration of the catalyst was conducted by purging with hydrogen after it had become partially deactivated by the accumulation of carbonaceous deposits. The pressure of the system was released and then purged with nitrogen. The catalyst was then heated to about 950° F. and air was introduced along with the nitrogen. The concentration of air was regulated to produce a maximum temperature of 1050° F. in the catalyst bed. During this operation the temperature at various points in the bed was ascertained with two thermocouples, one located in the upper part and the other in the lower part of the bed. The flow of nitrogen and air through the reactor was continued for about ½ hour, after the temperature dropped to about 950° F. Following another nitrogen purge, the system was again placed under hydrogen pressure for about 1 hour, while the hydrogen rate and temperature was being adjusted before feeding the naphtha again.

CATALYST XXII

Sixty-five grams of mercuric oxide were added slowly to a 20 gallon barrel containing 400 grams of new aluminum pellets, 12,216 grams of used aluminum pellets and 18 liters of distilled water. A 7″ blade stirrer on a ⅛ H. P. lightning mixer, used for agitation, was placed close to the bottom of the barrel. Additional stirring was accomplished by manually moving the aluminum pellets with a 3 foot stick. To start the reaction, live steam was run into the mixture until boiling occurred, which took 4 minutes. After 1.58 hours, the produced alumina slurry was filtered through a cheesecloth.

The weight of the slurry was 11,746 grams. Its pH was 9.00 at 28° C. An ignition loss reported 16.32% solids, which indicated 1920 grams of $Al_2O_3$ were formed.

Further calculations showed 1017 grams of aluminum were dissolved. Approximately 1.5 hours later, the slurry weight 11,395 grams.

Approximately 3797 grams of slurry (640 g. Al$_2$O$_3$) were placed in a glass jug and stirred. Five minutes after adding 30 cc. of facial acetic acid diluted to 60 cc., the pH was 5.05 at 24.5° C. Activation was performed by the addition of 144 cc. of Pt(NH$_3$)$_4$Cl$_2$ solution (0.0222 g. Pt/cc.) diluted to 250 cc. The platinous tetrammine chloride solution had been previously prepared by dissolving platinous choride, PtCl$_2$, in concentrated ammonium hydroxide while heating gently.

After 15 minutes agitation, the activated alumina slurry was placed in the Grieve-Hendry oven where it dried over the weekend at 240° F. The dried material was hard with a glossy brown-black surface. It was placed into a quartz tray and calcined at 1000° F., for 3 hours in a Cooley furnace. The light gray powder weighed 637 grams.

Pills, measuring 3/16" in diameter, were prepared, weighing 615 grams. They were transferred to a quartz tray and placed in a Cooley furnace where they were calcined 3 hours at 1000° F. The light gray, and slightly speckled pellets weighed 603 grams.

A test unit charge was prepared, measuring 550 cc. and weighing 316 grams. An analysis showed the finished catalyst contained 0.50% Pt and 0.14% Cl.

Employing the procedure described above, the data thus obtained is given in the Table I below.

Table 1

| Run No. | 1 | 2 | 3 | 4 |
|---|---|---|---|---|
| Catalyst | I | II | III | IV |
| Operating Conditions: | | | | |
| Temperature, °F | 898 | 900 | 900 | 901 |
| Pressure, p. s. i. g | 250 | 250 | 250 | 250 |
| Space Vel., W$_o$/hr./W$_c$ | 1.01 | 1.01 | 1.00 | 1.03 |
| Hydrogen, S. C. F. B | 4,838 | 4,610 | 4,915 | 4,735 |
| Length of Period, Hrs | 8 | 8 | 7 | 8 |
| Yields (Output Basis): | | | | |
| Hydrogen, S. C. F. B | 495 | 456 | 444 | 429 |
| Dry Gas, S. C. F. B | 881 | 824 | 724 | 844 |
| Total Butanes, Vol. Percent | 5.5 | 6.8 | 2.7 | 5.9 |
| Liquid Product, Vol. Percent | 88.2 | 87.0 | 89.1 | 87.1 |
| C$_4$ free Liquid, Vol. Percent | 81.9 | 80.3 | 86.7 | 81.1 |
| 100% C$_4$ Gasoline, Vol. Percent | 84.6 | 83.5 | 86.8 | 84.2 |
| 10# RVP Gasoline, Vol. Percent | 87.9 | 85.1 | 94.5 | 86.8 |
| Excess Butanes for 10# RVP Gasoline, Vol. Percent | −3.3 | −1.6 | −7.7 | −2.6 |
| Polymer, Vol. Percent | 3.2 | 4.4 | 3.6 | 3.3 |
| Feed Cracked, Vol. Percent | 42.9 | 44.1 | 25.9 | 45.5 |
| Octane No. (CFRR—clear): | | | | |
| C$_4$ free Gasoline | 84.9 | 86.0 | 68.9 | 86.1 |
| 100% C$_4$ Gasoline | 85.8 | 87.1 | 70.0 | 87.0 |
| 10# RVP Gasoline | 86.4 | 87.3 | 72.5 | 87.4 |
| Yield of C$_4$ free liquid at 85 CFRR Octane No. | 82.3 | 81.8 | 80.9 | 82.3 |
| Space Velocity to obtain 85 CFRR Oct. No. C$_4$ free Gasoline | 1.01 | 1.08 | 0.49 | 1.11 |

| Run No. | 5 | 6 | 7 | 8 |
|---|---|---|---|---|
| Catalyst | V | VI | VIII | IX |
| Operating Conditions: | | | | |
| Temperature, °F | 904 | 901 | 901 | 899 |
| Pressure, p. s. i. g | 250 | 250 | 250 | 250 |
| Space Vel., W$_o$/hr./W$_c$ | 1.04 | 0.97 | 0.95 | 1.01 |
| Hydrogen Rate, S. C. F. B | 4,747 | 5,251 | 5,347 | 4,838 |
| Length of Period, Hrs | 8 | 8 | 8 | 8 |
| Yields (Output Basis): | | | | |
| Hydrogen, S. C. F. B | 473 | 421 | 456 | 447 |
| Dry Gas, S. C. F. B | 971 | 840 | 871 | 792 |
| Total Butanes, Vol. Percent | 7.3 | 6.5 | 5.4 | 7.9 |
| Liquid Product, Vol. Percent | 85.3 | 85.1 | 86.9 | 89.7 |
| C$_4$ free Liquid, Vol. Percent | 77.5 | 80.6 | 82.8 | 82.7 |
| 100% C$_4$ Gasoline, Vol. Percent | 81.8 | 82.9 | 84.8 | 88.1 |
| 10# RVP Gasoline, Vol. Percent | 82.0 | 84.1 | 88.2 | 88.1 |
| Excess Butanes for 10# RVP Gasoline, Vol. Percent | −0.2 | −1.2 | −3.4 | 0 |
| Polymer, Vol. Percent | 3.6 | 4.2 | 3.4 | 2.5 |
| Feed Cracked, Vol. Percent | 48.1 | 45.1 | 42.8 | 45.9 |
| Octane No. (CFRR—clear): | | | | |
| C$_4$ free Gasoline | 90.5 | 87.3 | 82.4 | 84.3 |
| 100% C$_4$ Gasoline | 91.3 | 88.2 | 83.5 | 85.7 |
| 10# RVP Gasoline | 91.3 | 88.3 | 84.2 | 85.7 |
| Yield of C$_4$ free Liquid at 85 CFRR Octane No. | 81.8 | 82.8 | 81.4 | 82.4 |
| Space Velocity to obtain 85 CFRR Oct. No. C$_4$ free Gasoline | 1.54 | 1.01 | 0.82 | 0.97 |

| Run No. | 9 | 10 | 11 | 12 |
|---|---|---|---|---|
| Catalyst | X | XI | XII | XIII |
| Operating Conditions: | | | | |
| Temperature, °F | 902 | 901 | 900 | 900 |
| Pressure, p. s. i. g | 250 | 250 | 250 | 250 |
| Space Vel., W$_o$/hr./W$_c$ | 0.97 | 1.02 | 1.01 | 1.02 |
| Hydrogen Rate, S. C. F. B | 5,158 | 4,961 | 5,083 | 4,664 |
| Length of Period, Hrs | 8 | 8 | 8 | 8 |
| Yields (Output Basis): | | | | |
| Hydrogen, S. C. F. B | 857 | 235 | 547 | 488 |
| Dry Gas, S. C. F. B | 1,215 | 663 | 887 | 877 |
| Total Butanes, Vol. Percent | 7.5 | 8.0 | 8.3 | 8.4 |
| Liquid Product, Vol. Percent | 86.2 | 85.5 | 88.0 | 85.7 |
| C$_4$ free Liquid, Vol. Percent | 80.8 | 79.2 | 81.7 | 80.1 |
| 100% C$_4$ Gasoline, Vol. Percent | 84.5 | 83.5 | 86.5 | 84.4 |
| 10# RVP Gasoline, Vol. Percent | 85.0 | 83.1 | 86.0 | 84.0 |
| Excess Butanes for 10# RVP Gasoline, Vol. Percent | −0.5 | 0.4 | 0.5 | 0.4 |
| Polymer, Vol. Percent | 3.7 | 3.8 | 3.5 | 4.2 |
| Feed Cracked, Vol. Percent | 45.8 | 47.3 | 47.7 | 50.5 |
| Octane No. (CFRR—clear): | | | | |
| C$_4$ free Gasoline | 87.8 | 88.7 | 87.0 | 87.7 |
| 100% C$_4$ Gasoline | 88.8 | 89.7 | 88.1 | 88.8 |
| 10# RVP Gasoline | 88.8 | 89.6 | 88.0 | 88.8 |
| Yield of C$_4$ free liquid at 85 CFRR Octane No. | 82.6 | 81.6 | 83.0 | 81.8 |
| Space Velocity to obtain 85 CFRR Oct. No. C$_4$ free Gasoline | 1.17 | 1.31 | 1.16 | 1.23 |

| Run No. | 13 | 14 | 15 | 16 |
|---|---|---|---|---|
| Catalyst | XIV | XV | XVI | XVII |
| Operating Conditions: | | | | |
| Temperature, °F | 902 | 900 | 901 | 902 |
| Pressure, p. s. i. g | 250 | 250 | 250 | 250 |
| Space Vel., W$_o$/hr./W$_c$ | 1.00 | 1.00 | 0.96 | 0.97 |
| Hydrogen, S. C. F. B | 4,984 | 5,063 | 5,160 | 5,413 |
| Length of Period, Hrs | 8 | 8 | 8 | 8 |
| Yields (Output Basis): | | | | |
| Hydrogen, S. C. F. B | 225 | 394 | 299 | 282 |
| Dry Gas, S. C. F. B | 577 | 800 | 642 | 706 |
| Total Butanes, Vol. Percent | 14.0 | 10.4 | 14.5 | 9.2 |
| Liquid Product, Vol. Percent | 88.8 | 85.5 | 88.9 | 85.9 |
| C$_4$ free Liquid, Vol. Percent | 78.2 | 78.3 | 77.8 | 77.9 |
| 100% C$_4$ Gasoline, Vol. Percent | 89.1 | 85.4 | 89.5 | 85.4 |
| 10# RVP Gasoline Vol. Percent | 82.1 | 82.6 | 81.5 | 83.4 |
| Excess Butanes for 10# RVP Gasoline, Vol. Percent | 7.0 | 2.8 | 8.0 | 2.0 |
| Polymer, Vol. Percent | 3.1 | 3.4 | 2.8 | 3.3 |
| Feed Cracked, Vol. Percent | 58.8 | 52.4 | 63.3 | 50.5 |
| Octane No. (CFRR—clear): | | | | |
| C$_4$ free Gasoline | 86.6 | 88.2 | 88.0 | 88.4 |
| 100% C$_4$ Gasoline | 88.6 | 89.5 | 89.8 | 89.5 |
| 10# RVP Gasoline | 87.6 | 89.2 | 88.8 | 89.2 |
| Yield of C$_4$ free liquid at 85 CFRR Octane No. | 79.2 | 80.4 | 79.7 | 81.7 |
| Space Velocity to obtain 85 CFRR Oct. No. C$_4$ free Gasoline | 1.11 | 1.24 | 1.18 | 0.93 |

| Run No. | 17 | 18 | 19 | 20 |
|---|---|---|---|---|
| Catalyst | XVIII | XIX | XX | XXII |
| Operating Conditions: | | | | |
| Temperature, °F | 901 | 903 | 901 | 901 |
| Pressure, p. s. i. g | 250 | 250 | 250 | 500 |
| Space Vel., W$_o$/hr./W$_c$ | 0.99 | 1.01 | 0.98 | 1.02 |
| Hydrogen, S. C. F. B | 4,909 | 5,093 | 4,723 | 4,374 |
| Length of Period, Hrs | 8 | 8 | 8 | 8 |
| Yields (Output Basis): | | | | |
| Carbon, Wt. Percent | | | | 0.045 |
| Hydrogen, S. C. F. B | 616 | 555 | 230 | 582 |
| Dry Gas, S. C. F. B | 989 | 949 | 581 | 773 |
| Total Butanes, Vol. Percent | 7.5 | 7.4 | 11.6 | 4.3 |
| Liquid Product, Vol. Percent | 88.1 | 88.1 | 90.1 | 92.8 |
| C$_4$ free Liquid, Vol. Percent | 81.2 | 81.3 | 80.0 | 88.1 |
| 100% C$_4$ Gasoline, Vol. Percent | 84.9 | 85.8 | 88.4 | 88.6 |
| 10# RVP Gasoline, Vol. Percent | 85.2 | 86.5 | 84.6 | 94.4 |
| Excess Butanes for 10# RVP Gasoline, Vol. Percent | −0.3 | −0.7 | 3.8 | −5.8 |
| Polymer, Vol. Percent | 3.8 | 2.9 | 3.2 | 3.8 |
| Feed Cracked, Vol. Percent | 51.3 | 49.7 | 54.2 | 31.6 |
| Octane No. (CFRR—clear): | | | | |
| C$_4$ free Gasoline | 86.0 | 86.4 | 84.4 | 78.7 |
| 100% C$_4$ Gasoline | 87.2 | 87.5 | 86.4 | 79.7 |
| 10# RVP Gasoline | 87.2 | 87.6 | 85.8 | 81.0 |
| Yield of C$_4$ free liquid at 85 CFRR Octane No. | 81.9 | 80.4 | 79.7 | 84.7 |
| Space Velocity to obtain 85 CFRR Oct. No. C$_4$ free Gasoline | 1.06 | 1.11 | 0.94 | 0.73 |

It should be noted from the data that Catalyst IV resulted in better selectivity and activity in the reforming of naphtha than Catalyst II by reason of the pH adjustment to a higher level and the aging of the alkaline treated alumina. This serves to indicate the advantage in treating the alumina sol with an alkaline reagent and aging the same by reason that a better alumina is produced thereby. Catalyst VI involved the addition of ammonium molybdate to the slurry of alumina. The results obtained with this catalyst show that a more selective reaction is effected than Catalyst II which involved the addition of ammonium molybdate to calcined alumina. Catalyst IX was prepared by the addition of silicon tetrachloride to the alumina in order to effect a greater stability of the catalyst at an elevated temperature. When comparing Catalyst IX with Catalyst II, it is noted that the selectivity, measured as the yield of $C_4$ free liquid at 85 CFRR octane number, is greater than the selectivity of Catalyst II. Heretofore, the addition of silica to molybdena catalyst was done for the purpose of improving the stability of the catalyst at elevated temperatures. It is unexpected to observe that the selectivity of the catalyst should improve by the addition of silica, because normally silica is considered to be a cracking component and, therefore, the greater yield of liquid product is not anticipated in a hydroforming process. In the case of Catalyst X, the silica was added in the form of ethyl silicate. Comparing Catalyst X with Catalyst II and Catalyst IX, it is to be observed that the addition of silica in the form of an organic silicate results in a catalyst of greater selectivity and activity than a catalyst without silica and one which contains silica through the addition of silicon tetrachloride. Clearly therefore, the incorporation of silica by means of an organic silicate, such as for example, the alkyl silicates, the aryl silicates, the alkaryl silicates, the aralkyl silicates, etc., produces a catalyst of improved selectivity and activity when the alumina of the catalyst has been prepared in the manner of the present invention.

Catalyst XI was obtained by the calcination of Catalyst X at a temperature of 1470° F. and for 6 hours. It is shown in Table I that the selectivity of this catalyst decreased slightly as a result of calcination; whereas the activity increased significantly. In Catalyst XII the pH of the alumina sol was lowered by the addition of acetic acid. This was done to study the effect of lowering the pH of the alumina upon catalyst selectivity and activity. It is to be noted from Catalyst XII that the selectivity increased slightly; whereas the activity is substantially the same. It appears, therefore, that the lowering of the pH of the alumina sol may not have adverse effects upon catalyst property. Catalyst XIV is a silica containing catalyst which was prepared by the use of silica-alumina cracking catalyst hydrogel. As a result of adding silica in the form of the cracking catalyst hydrogel, it is noted that the selectivity decreased, as can be observed from the comparison with Catalyst II, and the activity increased. Catalyst XV is the result of calcining Catalyst XIV at 1470° F. for a 6-hour period. Quite unexpectedly it is observed that the selectivity and activity of the calcined catalyst increases. This phenomenon is unusual because it might be expected that the activity would increase somewhat by high temperature treatment and not the selectivity thereof. The preparation of Catalyst XIV was varied by lowering the pH of the alumina sol and this is shown as Catalyst XVI. From Table I it is to be noted that as a result of lowering the pH in the catalyst preparation, the selectivity and activity improved slightly. Catalyst XVI was subjected to a calcination treatment at 1470° F. for a 6 hour period and the resultant catalyst is Catalyst XVII. It is to be observed by a comparison of Catalyst XVI that the selectivity of the catalyst improved significantly; whereas the activity decreased. This is contrary to expectations, because one might suppose both the activity and selectivity might increase slightly, but not as much as the results show. Catalyst XX is a silica containing catalyst which was prepared by the use of silica-alumina cracking catalyst hydrogel. The silica concentrate was approximately one-half of what was employed in the preparation of Catalyst XIV. It is to be noted by comparison that the selectivity was slightly higher in the case of Catalyst XX; whereas the activity was lowered. Catalyst XXII is a platinum catalyst which was prepared in accordance with the present invention.

From the above remarks, it appears that a silica containing catalyst which was prepared by the use of silica-alumina cracking catalyst hydrogel, should be subjected to an additional high temperature treatment in order to improve the activity and selectivity. Accordingly, such a catalyst should be subjected to a temperature of at least about 1200° F. and this temperature can be as high as about 1600° F., preferably the high temperature treatment should be effected at a temperature of about 1450° to about 1600° F. The period of treatment may vary from about 1 hour to about 12 hours, however, more usually, about 4 hours to about 8 hours. The silica-alumina cracking catalyst hydrogel can be any gel type silica-alumina material containing about 70 to about 99% silica based on the total weight of the gel. The remainder of the gel constitutes alumina.

This application is related to copending application Serial No. 290,323, filed May 27, 1952.

Having thus provided a description of my invention with specific examples, it should be understood that no undue limitations or restrictions are to be imposed by reason thereof, but that the scope of the present invention is defined by the appended claims.

I claim:

1. A method of preparing a catalyst consisting essentially of reacting aluminum, water and a compound of a metal selected from the group consisting of mercury, zinc and cadmium in an amount from 0.0005 to about 0.1 pound per pound of aluminum at a temperature of at least about 150° F. to produce alumina in a slurry having a pH between about 7.5 and about 9.5; combining the alumina with a suitable precursor material of a catalytic agent selected from the group consisting of molybdenum oxide and platinum and subjecting the mixture thus obtained to an elevated temperature sufficient to produce a catalytic agent supported on the alumina.

2. A method of producing a catalyst consisting essentially of reacting aluminum, water and a compound of a metal selected from the group consisting of mercury, zinc and cadmium in an amount from 0.0005 to about 0.1 pound per pound of aluminum at a temperature of at least about 150° F. to produce alumina in a slurry having a pH between about 7.5 and about 9.5; combining a silica forming substance, the alumina and a suitable precursor material of a catalytic agent selected from the group consisting of molybdenum oxide and platinum; and subjecting the resultant mixture to an elevated temperature sufficient to produce a catalyst containing the catalytic agent supported on alumina and silica.

3. The method of claim 2 wherein the silica forming substance is an organic silicate, and the alumina is prepared at a temperature of about 175° to about 300° F.

4. The method of claim 2 wherein the silica forming substance is a silica-alumina gel containing about 70 to about 99% by weight of silica.

5. The method of claim 3 wherein the organic silicate is an alkyl ester of silicic acid.

6. The method of claim 4 which is further characterized by subjecting the finished catalyst to a treatment at a temperature of about 1200° to about 1600° F. for a period sufficient to improve the selectivity and activity of the catalyst.

7. A method of preparing a catalyst consisting essentially of reacting aluminum, water and an oxide of a metal selected from the group consisting of mercury, zinc and cadmium in an amount from 0.0005 to about 0.1 pound per pound of aluminum at a temperature of about 175° to about 300° F. to produce a slurry of alumina having a pH between about 7.5 and about 9.5, combining the slurry of alumina with a precursor material of molybdenum oxide in a quantity sufficient to produce a finished catalyst containing about 0.1 to about 30% of molybdenum oxide, and subjecting the resultant mixture to a calcination treatment for a period sufficient to produce the finished catalyst.

8. A method of preparing a catalyst consisting essentially of reacting aluminum, water and mercuric oxide in an amount from 0.0005 to about 0.1 pound per pound of aluminum at a temperature of about 175° to about 300° F.; combining the resultant alumina with an alkaline agent to raise the pH to at least about 8.5 and aging the alkalized alumina for a period of at least about 10 hours, combining the aged alumina with ammonium molybdate in a quantity sufficient to produce the finished catalyst containing about 0.1 to about 30% of molybdenum oxide, and subjecting the resultant mixture to a calcination treatment to convert the ammonium molybdate to molybdenum oxide.

9. The method of preparing a catalyst consisting essentially of reacting aluminum, water and mercuric oxide in an amount from 0.0005 to about 0.1 pound per pound of aluminum at a temperature of about 175° to about 300° F. to produce a slurry of alumina having a pH between about 7.5 and about 9.5, combining the slurry of alumina with ethyl orthosilicate in a quantity sufficient to produce the finished catalyst containing about 0.5 to about 15% of silica and ammonium molybdate in a quantity sufficient to produce the finished catalyst containing about 0.1 to about 30% of molybdenum oxide, and calcining the resultant mixture for a period sufficient to convert the ammonium molybdate to molybdenum oxide and the ethyl orthosilicate to silica.

10. The method of producing a catalyst consisting essentially of reacting aluminum, water and mercuric oxide in an amount from 0.0005 to about 0.1 pound per pound of aluminum at a temperature of about 175° to about 300° F. to produce alumina in a slurry having a pH between about 7.5 and about 9.5, combining the alumina with a silica-alumina gel containing about 70 to about 99% of silica in a quantity sufficient to produce a finished catalyst containing 0.5 to about 15% of silica and ammonium molybdate in a quantity sufficient to produce a finished catalyst containing about 0.1 to about 30% of molybdenum oxide, subjecting the resultant mixture to a calcination treatment for a period sufficient to convert the ammonium molybdate to molybdenum oxide, and further treating the finished catalyst at a temperature of about 1450° to about 1600° F. in order to enhance the activity and selectivity thereof.

References Cited in the file of this patent

UNITED STATES PATENTS

| | | |
|---|---|---|
| Re. 22,196 | Heard | Oct. 6, 1942 |
| 1,868,499 | Guertler | July 26, 1932 |
| 2,217,865 | Groll et al. | Oct. 15, 1940 |
| 2,274,633 | Pitzer | Mar. 3, 1942 |
| 2,288,336 | Welty et al. | June 30, 1942 |
| 2,371,237 | Heard | Mar. 13, 1945 |
| 2,422,372 | Smith et al. | June 17, 1947 |
| 2,432,286 | Claussen et al. | Dec. 9, 1947 |
| 2,448,960 | Connolly | Sept. 7, 1948 |
| 2,449,847 | Heard | Sept. 21, 1948 |
| 2,461,959 | Brandon | Feb. 15, 1949 |
| 2,469,314 | Ryland et al. | May 3, 1949 |
| 2,487,466 | Nahin | Nov. 8, 1949 |
| 2,582,428 | Haensel | Jan. 15, 1952 |

OTHER REFERENCES

Publication: "Thermal Transformations of Aluminas," Stumpf et al., July 1950, "Ind. and Eng. Chem.," vol. 42, pages 1398–1403.

UNITED STATES PATENT OFFICE

CERTIFICATE OF CORRECTION

Patent No. 2,840,529  
June 24, 1958

Philip A. Lefrancois

It is hereby certified that error appears in the printed specification of the above numbered patent requiring correction and that the said Letters Patent should read as corrected below.

Column 8, line 24, before "alumina" insert --the--; column 10, line 59, for "2850 C." read --28.5° C.--; column 13, line 6, for "facial" read --glacial--.

Signed and sealed this 14th day of October 1958.

(SEAL)  
Attest:  
KARL H. AXLINE  
Attesting Officer

ROBERT C. WATSON  
Commissioner of Patents